United States Patent Office 2,911,374
Patented Nov. 3, 1959

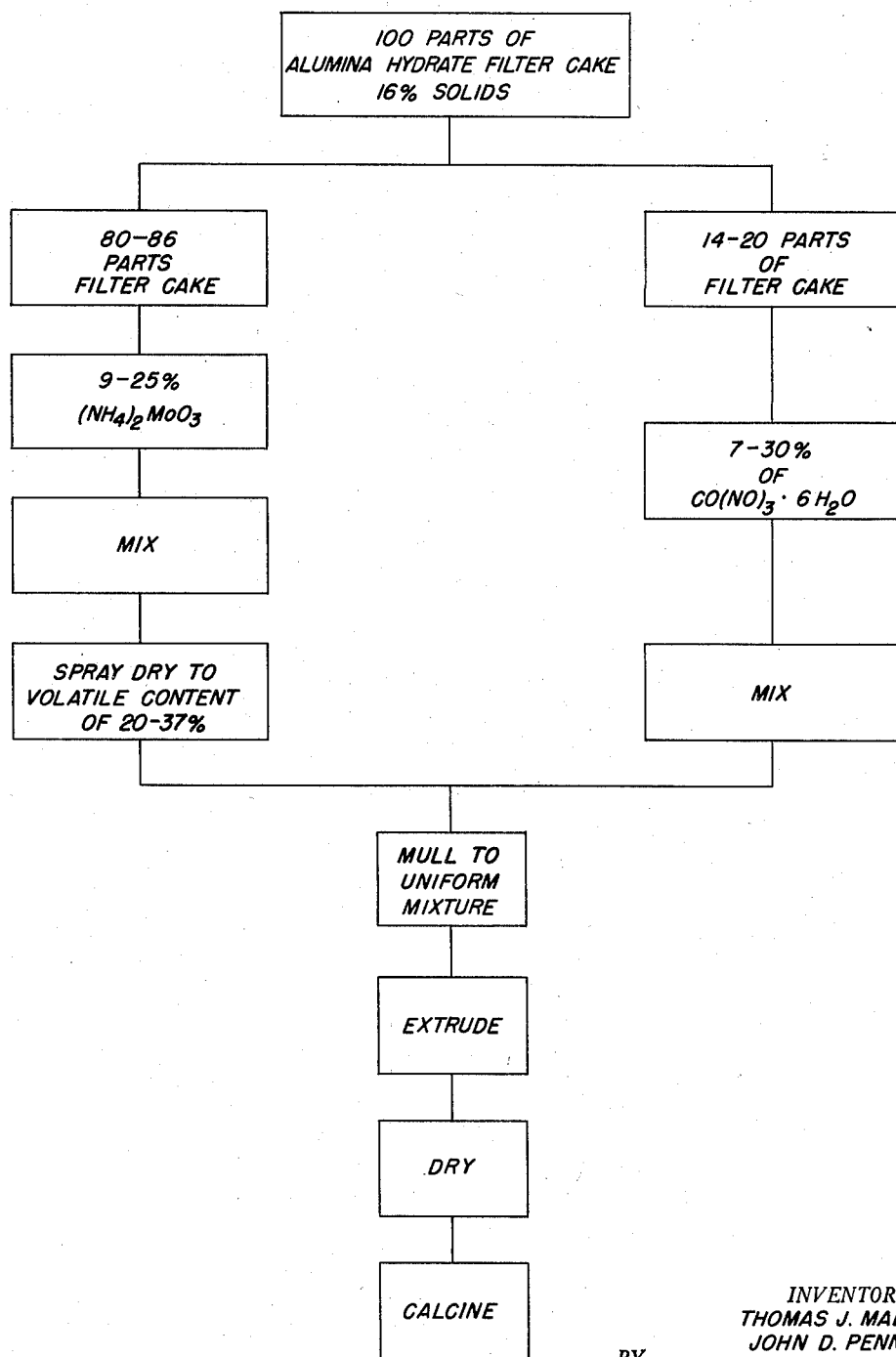

2,911,374

PREPARATION OF DESULFURIZATION CATALYSTS

Thomas J. Malley and John D. Pennell, Stamford, and Harvey D. Schindler, Darien, Conn., assignors to American Cyanamid Company, New York, N.Y., a corporation of Maine Application June 6, 1957, Serial No. 663,995

3 Claims. (Cl. 252—465)

The present invention relates to an improved process for the preparation of hydrodesulfurization catalysts such as are employed in the desulfurization of hydrocarbon fractions such as petroleum gases, vapors and liquids. More particularly, it relates to an improved process for the preparation of extruded hydrodesulfurization catalysts.

Pelleted as opposed to extruded molybdenum and cobalt activated alumina base hydrodesulfurization catalysts are, for the most part, well known, as is their use in the desulfurization of petroleum fractions to remove organic sulfur-containing compounds, and thus generally increase the saleability and utility of said petroleum fractions.

Desulfurization catalysts of the type contemplated are normally prepared by employing pelleting apparatus because of the difficulties encountered in extrusion procedures. Generally, in the preparation of catalysts in extruded form, many difficulties are encountered which are magnified and intensified when attempts are made to produce them on a commercial scale. This is particularly true if the catalyst produced is to be uniform and consistently prepared having a high degree of activity, as calculated on a weight and volume basis as these terms are understood in the art, and is to have good compression strength, a highly desirable if not essential prerequisite for fixed bed catalysts.

Thus, for example, catalyst mixtures having water contents in excess of those suited for the provision of an extrudable mass are usually too free-flowing or soupy to be properly extrudable. In addition, this physical condition increases the difficulty of other processing problems as, for example, the drying of the extruded catalyst mixture and, in addition, in some instances, has been found to adversely affect the activity of the final catalyst product.

If the catalyst mixture is too plastic, after extrusion, the extruded pellets have a strong tendency to adhere to one another, which characteristic may destroy the saleability of a given production run. Further, this condition of catalyst mixture may be reflected in the compression strength of the final extruded catalyst product.

On the other hand, if the plasticity or the consistency of the catalyst mass for extrusion is insufficiently fluid, it may be impossible to produce extruded pellets, in view of the fact that the extruder is unable to move the material through the die head.

Between the various states of extrudable material generally described hereinabove, there exists a multiplicity of physical states of the catalyst material which are equally objectionable for one or more reasons, which reason or reasons are frequently intensified when production is scaled up to commercial quantities, and very frequently these shortcomings are not readily overcome by modifying the catalyst mixture just prior to extrusion. Thus, for example, in the case of certain catalyst mixtures which do not appear to have the proper fluidity or plasticity, it would be thought that the addition of water to the mixture might be employed to improve this characteristic and provide a readily extrudable catalyst mixture. However, it has been found that such modifications have adversely affected the catalytic activity of the final extruded catalyst product, and thus was an undesirable modification.

Therefore, it is an object of the present invention to provide a novel process for the preparation of extruded desulfurization catalyst and more specifically cobalt and molybdenum activated alumina base catalysts, whereby a catalyst mixture is prepared which may be readily extrudable in conventional solids extrusion apparatus of the type normally employed in the manufacture of catalysts.

It is a further object to provide such a process whereby an extruded catalyst of high activity and compression strength are obtained.

These and other objects and advantages of the present invention will become apparent from the detailed description of the present process, as it is set forth hereinbelow.

According to the present invention, a process is provided for the preparation of a cobalt and molybdenum activated alumina base desulfurization catalyst which comprises mixing together (a) a mixture of 80–86 parts (preferably 82–84 parts) by weight of alumina hydrate filter cake and 9–25% expressed as $MoO_3$, based on total solids in this mixture, of a water-soluble molybdenum compound capable of being converted to its oxide, spray dried to a water content of from 20–37% and (b) a mixture of 14–20 parts (preferably 16–18 parts) of alumina hydrate filter cake and 7–30% expressed as $CoO$, based on the total solids in this mixture, of a water-soluble cobalt salt capable of being converted to its oxide. The mixture of the two components (a) and (b) produces a catalyst mixture having a total volatile content of from between 53 and 57%, and preferably from between 54 and 56%, and may be extruded in conventional solids extrusion apparatus, after which the extruded pellets are dried and calcined. The above-defined volatile content represents a solids content of from between 43 and 47%, and preferably from between 44 and 46% solids. By "total volatile content," as the term is used herein, is meant both combined water, as water of hydration, and apparent or free water, as well as other volatile constituents, such as ammonia and the like. Water, both free and combined, usually constitutes at least 90% of the total volatiles with ammonia and nitrates (when ammonium molybdate and cobalt nitrate are employed) and other volatiles removed during calcination, constituting 10% and less, depending upon the desired final composition of the catalyst. The total volatile content as expressed herein is determined by loss on ignition at 700° C.

An embodiment of the present invention will now be described in greater detail with reference to the accompanying drawing, the single feature of which is a flow sheet illustration of a specific embodiment thereof. Referring to the flow sheet, it will be seen that 100 parts of an alumina hydrate filter cake containing 16% of solids is divided into two portions. The major portion containing from 80 to 86 parts by weight of the alumina hydrate filter cake is uniformly mixed with from between 9 and 25% based on the weight of the total solids of this mixture, and expressed as $MoO_3$ of a water-soluble molybdate as, for example, that illustrated, namely ammonium molybdate. This uniformly mixed alumina hydrate filter cake ammonium molybdate modified portion of the original filter cake is then spray dried to a heat-hardened alumina gel which is apparently dry but has a volatile content of from between 20 and 37%, as determined by loss on ignition at 700° C. If expressed as solids content, the mixture would contain from 63–80% of solids.

A second portion of the original alumina hydrate filter cake containing from between 14 and 20 parts by weight thereof is then uniformly mixed with from between 7 and 30%, based on the weight of total solids of this mixture of a water-soluble cobalt salt as, for example, that illustrated, namely cobalt nitrate hexahydrate, but is not dried.

Thereafter, the major fraction of the final catalyst mixture, the molybdate modified alumina portion, and the minor fraction, namely the cobalt modified alumina hydrate portion, are mulled to obtain a uniform mixture. At this particular point in the process, if all of the conditions above specified are adhered to, the catalyst mixture will have a consistency suitable for extrusion in conventional solids extrusion apparatus.

Either during the mulling step or in the subsequent step of extrusion in the present process, a lubricant may be introduced into the catalyst mixture, usually in amounts of from about 1% of the total batch weight and rarely in amounts in excess of 3% thereof. As an example of a suitable conventional lubricant material, there is graphite. In addition, soaps, fatty acids and glycerides may be employed for such purposes.

The mulled composition is then placed or charged into an extruder, such as a dual worm type, with a water-cooling jacket, and pressed through a die having a multiplicity of holes, having a diameter, for example, of 0.147 inch. As the material is freely extruded, a set of rotary knives or wire cutters are used to size the final catalyst pellets.

These "green" catalyst pellets are of such plasticity that they are neither too hard, which tends to cause them to crumble, nor too soft, which tends to cause them to adhere one to the other, with resultant distortion of shape. The extruded "green" pellets are then dried as, for example, at temperature of from between 200 and 250° F. for a period of time of about 20 minutes, and are thereafter calcined by heating them to temperatures of from between 1250° F. and 1350° F. during about 3 hours, and holding them at a temperature within this range for an additional 1 to 2 hours and until they are subbstantially completely dehydrated.

The alumina hydrate filter cake employed as a starting material in the process of the present invention may be prepared by any of the procedures known in the prior art, but may be conveniently prepared according to that method described in U.S. Patent No. 2,675,115, in the name of K. D. Ashley, which disclosure is incorporated by reference in the present specification. In accordance with the process disclosed in the above said patent, alkali metal-free alumina hydrate is prepared by the precipitation of alumina hydroxide from aqueous alkali metal aluminate solutions by the reaction of said aluminate solutions with mineral acids under particular pH conditions. Alumina hydrate filter cakes prepared by the method described in a above-identified patent, or alumina hydrate filter cakes prepared by other known methods, desirably contain from between about 10 and 20% solids and preferably from between about 13 and 17% of solids.

The molybdate compound employed in the present process may be any water-soluble molybdate capable of being converted to $MoO_3$. Ammoniacal solutions of $MoO_3$ are readily employable and for purposes of this invention are considered to be the equivalent of aqueous solutions of ammonium molybdate. The water-soluble molybdate is added to the alumina hydrate filter cake in amounts of from between 9 and 25%, based on the total solids of this portion of the final catalyst mixture. When added in such amounts to the filter cake, the final activated catalyst has a content of which is believed to be molybdenum oxide, of from between 7 and 20%. The alumina hydrate molybdate composition is then mixed so as to obtain a uniform mixture, the uniformity of which may be determined by an operator visually checking the mixing mass. Thereafter, the alumina hydrate-molybdate composition is spray dried to a solids content of from between 63 and 80% (volatile content 20–37%) and preferably from between 66% and 75% (volatile content 25–34%).

By spray drying the molybdenum-alumina portion of the catalyst mixture, alumina gel in the form of microspheres having a highly uniform particle size is obtained, having a solids content of from between 63–80% and a volatile content of about 20–37%. Any suitable spray drier may be used; one that has been employed with good resutls is described in U.S. Patent No. 2,644,516, dated Julye 7, 1953. Although gas inlet temperatures up to 1300° F. have been used successfully, the temperature of the drying gases entering the spray drying chamber is preferably controlled within the range of about 5000–1000° F. so that the hydrated alumina will be converted into a set partially dehydrated gel during the drying procedure.

Cobalt nitrate hexahydrate has been selected because of its availability as a source of cobalt oxide in the final catalyst. However, other water-soluble cobalt salts capable of being converted to their oxides, such as cobaltous acetate, may be employed. This portion of the final catalyst mixture is physically in what might be termed a "soupy" state. It may be mixed to achieve a uniform composition prior to mulling with the spray dried molybdate modified portion of the final catalyst composition, and preferably is. Alternatively, but less desirably, the alumina hydrate filter cake and the cobalt salt may be added to the spray dried molybdate modified portion in the muller where the action of the muller is relied upon to achieve uniformity of composition.

Mulling is continued until the catalyst composition appears to be uniform, which may generally be determined by noting the consistency of the mulled mass. Thus, if the said mass has uniform plasticity and is substantially homogeneous, it may be considered that the mulling is adequate. In a normal batch of 800 lbs., a typical muller as, for example, Lancaster #4½, usually requires from between 25 and 45 minutes to obtain a uniform homogeneous mixture.

As set forth above, a lubricant such as graphite may be added to the mulled mass and the said mass charged to a conventional solids extruder. By "conventional solids extruder" as the term is used herein is meant extruders of the type normally employed in extruded catalyst preparation and by way of reference to specific mechanical apparatus, a dual worm extruder, such as Welding Engineers Series 2800.

In order that the present invention may be more fully understood, the following examples are given primarily by way of illustration. No details contained therein should be construed as limitations on the present invention, except as they appear in the appended claims. All parts and percentages are by weight unless otherwise specifically designated.

*Example 1*

4000 lbs. of alumina hydrate filter cake containing 600 lbs. of $Al_2O_3$ (15% solids) was pumped to an agitated tank. 854 lbs. of a 15% $MoO_3$ solution as ammonia molybdate were then mixed with the filter make to insure complete distribution of the molybdenum oxide on the alumina. This amount of $MoO_3$ represents 17.6% $MoO_3$, based on the total solids, i.e. the oxides of alumina and molybdenum present in this mixture. This portion of the final catalyst mixture was then spray dried to 75% solids (25% volatiles) and had a powdery appearance.

4000 lbs. of alumina hydrate filter cake having 15% solids and containing 600 lbs. of $Al_2O_3$ are charged to an agitated mixing tank. 1386 lbs. of a 41.65% cobalt nitrate hexahydrate solution that contains 148.17 lbs. of CoO was added to the filter cake and the mixture was well agitated. This portion of the final catalyst mixture contained 19.6% of CoO, based on the total solids of this mixture. This mixture was about 14% solids.

Thereafter, 307 lbs. of the spray dried molybdena-modified alumina catalyst made as above were charged to a muller mixer and plasticized with 293 lbs. of a cobalt-alumina mix made as above. This mixture had a total solids content of about 45%. After about 25 minutes, when the catalyst composition is well mulled, 6 lbs. of powdered graphite was added as a lubricant and mixing was allowed to continue for an additional 5 minutes to distribute the graphite.

The above extrusion mix was then charged to a dual worm type of extruder having a water-cooling jacket and pressed through a die head having a multiplicity of holes of 0.147 inches in diameter. As the material was extruded, a set of rotary knives or wire cutters were used to size the pellets. Under and over-sized pellets were readily separated from the pellets of proper size as, for example, $3/16$ to $3/8$ of an inch in length, by the employment of a vibratory type screen. Thereafter, rejected pellets, if any, are recycled to the extruder or muller mixer for re-extrusion, while the proper sized pellets were dried at about 250° F. and calcined at 1300° F.

The final catalyst contained 15% $MoO_3$, 3% CoO and the balance alumina.

Example 2

To make 100 lbs. of finished catalyst product, an amount of a 15% solids alumina hydrate filter cake was mixed with an aqueous solution of ammonium molybdate and the mixture spray dried, in accordance with the procedure set forth in Example 1, to provide 106.5 lbs. of 80% spray dried solids containing 17.6% of the molybdate as $MoO_3$, based on total solids of this mixture.

This material was mulled with about 1% of graphite to uniformity with a mixture of 79.3 lbs. of a 15% solids filter cake which has been mixed with 34.2 lbs. of a 35.2% cobalt nitrate hexahydrate solution. The cobalt nitrate mixture has a solids content of about 15% and the mulled catalyst mixture has a solids content of about 44.6%.

The mulled mixture is thereafter extruded, dried and calcined as in Example 1, to provide an active, compression resistant catalyst containing 15% $MoO_3$, 3% CoO and the remainder alumina.

Example 3

To make 100 lbs. of finished catalyst product, an amount of a 15% solids alumina hydrate filter cake was mixed with an aqueous solution of ammonia molybdate and the mixture spray dried in accordance with the procedure set forth in Example 1 to provide 131 lbs. of 66% spray dried solids containing 17.6% of the molybdate expressed as $MoO_3$, based on total solids of this mixture.

This material was mulled with about 1% of graphite to uniformity with a mixture of 17.2 lbs. of a 70% cobalt nitrate hexahydrate solution and 71 lbs. of a 15% alumina filter cake. The cobalt nitrate mixture has a solids content of about 23% and the mulled catalyst mixture has a solids content of about 44.7%.

The mulled mixture is thereafter extruded, dried and calcined as in Example 1 to provide an active, compression resistant catalyst containing about 15% $MoO_3$, 3% CoO and the remainder alumina.

The catalyst produced according to the process of the present invention has the final composition of from between 7 to 20% of molybdenum oxide and from between 1 and 4% of cobalt oxide, the remainder being alumina.

It should be noted that in each of the above examples, the molybdenum oxide-modified and cobalt-modified portion of the final catalyst mixture need not be derived from the same filter cake as, for example, in the manner illustrated in the accompanying flow sheet, but full scale batches of both of these fractions may be prepared in order to fully utilize plant equipment from which batch the critical relative amounts of each may be withdrawn.

As noted hereinabove, the process of the present invention permits close operational control over the uniformity of the composition of the final catalyst, in addition to providing a method of control whereby uniformity of an extrudable green catalyst mixture can be obtained.

We claim:

1. A process for the preparation of a cobalt and molybdenum activated alumina base desulfurization catalyst which comprises mixing together (a) a mixture of 80-86 parts by weight of alumina hydrate filter cake and 9-25%, expressed as $MoO_3$ based on the total solids of this mixture, of a water-soluble molybdenum compound capable of being converted to its oxide, spray dried to a volatile content of from 20-37%; and (b) a mixture of 14-20 parts of alumina hydrate filter cake and 7-30%, expressed as CoO based on the total solids of this mixture, of a water-soluble cobalt salt capable of being converted to its oxide, thereby producing a catalyst mixture having a total solids content of from between 43 and 47%, which is extrudable in conventional solids extrusion apparatus, and extruding, drying and calcining said catalyst material.

2. A process for the preparation of a cobalt and molybdenum activated alumina base desulfurization catalyst which comprises mixing together (a) a mixture of 82-84 parts by weight of alumina hydrate filter cake and 9-25%, expressed as $MoO_3$ based on the total solids of this mixture, of a water-soluble molybdenum compound capable of being converted to its oxide, spray dried to a volatile content of from 20-37%; and (b) a mixture of 16-18 parts of alumina hydrate filter cake and 7-30%, expressed as CoO based on the total solids of this mixture, of a water-soluble cobalt salt capable of being converted to its oxide, thereby producing a catalyst mixture having a total solids content of from between 44-46%, which is extrudable in conventional solids extrusion apparatus, and extruding, drying and calcining said catalyst material.

3. A process for the preparation of a cobalt and molybdenum activated alumina base desulfurization catalyst which comprises mixing together (a) a mixture of 82-84 parts by weight of alumina hydrate filter cake and 9-25% of ammonium molybdate, expressed as $MoO_3$ based on the total solids of this mixture, spray dried to a volatile content of from 25-34%; and (b) a mixture of 16-18 parts of alumina hydrate filter cake and 7-30% of cobalt nitrate hexahydrate, expressed as CoO based on the total solids of this mixture, thereby producing a catalyst mixture having a total solids content of from between 44-46%, which is extrudable in conventional solids extrusion apparatus, and extruding, drying and calcining said catalyst material.

References Cited in the file of this patent

UNITED STATES PATENTS

| | | |
|---|---|---|
| 2,487,466 | Nahin | Nov. 8, 1949 |
| 2,793,170 | Stiles | May 21, 1957 |
| 2,799,661 | De Rosset | July 16, 1957 |

UNITED STATES PATENT OFFICE
CERTIFICATE OF CORRECTION

Patent No. 2,911,374                            November 3, 1959

Thomas J. Malley et al.

It is hereby certified that error appears in the printed specification of the above numbered patent requiring correction and that the said Letters Patent should read as corrected below.

Column 2, line 48, for "removed" read — removable —; column 4, line 11, for "Julye" read — July —; line 14, for "5000-" read — 500- —; line 61, for "make" read — cake —; line 71, for "148.17 lbs." read — 148.7 lbs. —.

Signed and sealed this 10th day of May 1960.

(SEAL)
Attest:

KARL H. AXLINE
Attesting Officer

ROBERT C. WATSON
Commissioner of Patents